United States Patent [19]

Hwang et al.

[11] Patent Number: 5,090,836
[45] Date of Patent: Feb. 25, 1992

[54] STRUCTURE OF A CONNECTING JOINT OF A CASE

[76] Inventors: Blake Hwang, No. 40, Shao-An Street; Ming-Ted Lee, No. 62, Ln. 94, Wen-Lin N. Road, both of, Taipei, Taiwan

[21] Appl. No.: 641,667

[22] Filed: Jan. 15, 1991

[51] Int. Cl.$^5$ .............................. F16B 7/00
[52] U.S. Cl. .................... 403/295; 403/297; 403/280
[58] Field of Search ............ 403/295, 297, 298, 408.1, 403/409.1, 280, 251, 248, 403, 401

[56] References Cited

U.S. PATENT DOCUMENTS

| | | | |
|---|---|---|---|
| 1,726,362 | 8/1929 | Orsenigo | 403/297 |
| 2,996,159 | 8/1961 | Casebolt | 403/280 |
| 3,313,199 | 4/1967 | Houvener et al. | 403/280 X |
| 3,438,659 | 4/1969 | Waldran | 403/280 |
| 3,462,893 | 8/1969 | Kaiser | 403/295 X |
| 3,613,279 | 10/1971 | Belfor | 403/295 X |
| 3,811,785 | 5/1974 | Hagglund | 403/297 X |
| 3,822,101 | 7/1974 | Schneider | 403/295 |
| 3,954,345 | 5/1976 | Morris | 403/297 |
| 4,636,105 | 1/1987 | Johansson | 403/295 X |
| 4,896,992 | 1/1990 | Muhlethaler | 403/297 |

FOREIGN PATENT DOCUMENTS

| | | | |
|---|---|---|---|
| 8310546 | 4/1989 | European Pat. Off. | 403/295 |
| 274425 | 5/1914 | Fed. Rep. of Germany | 403/295 |
| 2461474 | 8/1975 | Fed. Rep. of Germany | 403/295 |
| 2420569 | 10/1975 | Fed. Rep. of Germany | 403/295 |

Primary Examiner—Peter M. Cuomo
Attorney, Agent, or Firm—Poms, Smith, Lande & Rose

[57] ABSTRACT

An improved structure of a connecting joint used for a case. The connecting joint has a substantially right-angled connecting element provided with a plurality of elongated insertion blocks which engage compartments formed in a hollow insertion plate. An expansion block is inserted at one end into a vertical slot formed by the arrangement of a plurality of the elongated insertion blocks, and the other end thereof is inserted into the compartments formed in the hollow insertion plate. The expansion block has a slot therein that engages a wall of the hollow insertion plate.

1 Claim, 2 Drawing Sheets

STRUCTURE OF A CONNECTING JOINT OF A CASE

BACKGROUND OF THE INVENTION

The present invention relates to connecting joints used for a case, and, in particular, to an improved connecting joint used for a case having a rigid structure.

Conventional case structure is usually provided with fastening means on the external surfaces of the case casing. It is very common that the fastening means is formed from a male insertion member and a female insert holder. Such a fastening means is not durable and opens easily and accidentally.

SUMMARY OF THE PRESENT INVENTION

It is therefore an object of the present invention to provide an improved structure of a connecting joint used for a case which allows secure fastening during assembly. It is a further object of the present invention to provide an improved structure of a connecting joint of a case, having a plurality of elongated insertion blocks engaged to a center hollow holder and an expansion block so as to provide firm securing of the case. It is yet another object of this invention to provide an improved structure of a connecting joint used for a case which is of highly economical construction.

Other objects of this invention will become apparent from the following description when used in connection with the accompanying drawings of which:

DETAILED DESCRIPTION OF THE PREFERRED EMBODIMENT

Figure 1:
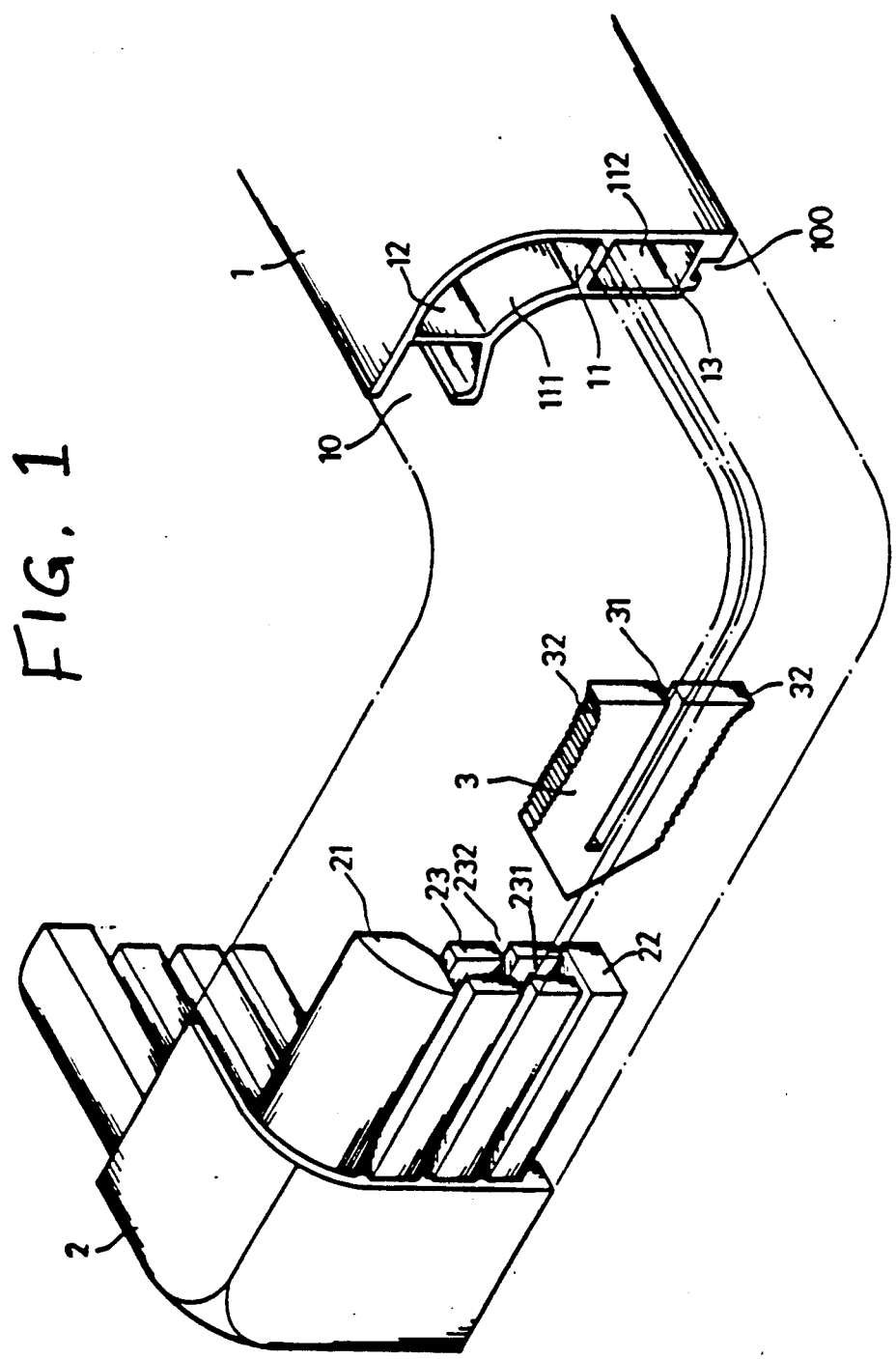
FIG. 1 is an exploded perspective view of an improved structure of a connecting joint use for a case in accordance with the present invention.

Referring now to FIG. 1, an improved structure of a connecting joint of a case can be seen. The connecting joint of the case structure comprises a hollow plate 1 having a substantially curved surface, a connecting element 2, and an expansion block 3. The hollow plate 1 includes an upper engaging slot 10 on the top edge thereof, and an upper compartment 111 within the center of the hollow insertion plate 1, which is formed by a horizontal partition wall 11, and a vertical partition wall 12. The plate 1 also includes a lower compartment 112 formed by the horizontal partition wall 11 and a lower partition wall 13. The bottom edge of the inserting plate 1 is provided with a lower engaging slot 100. These slots 10 and 100 engage case casing (not shown).

Figure 2:
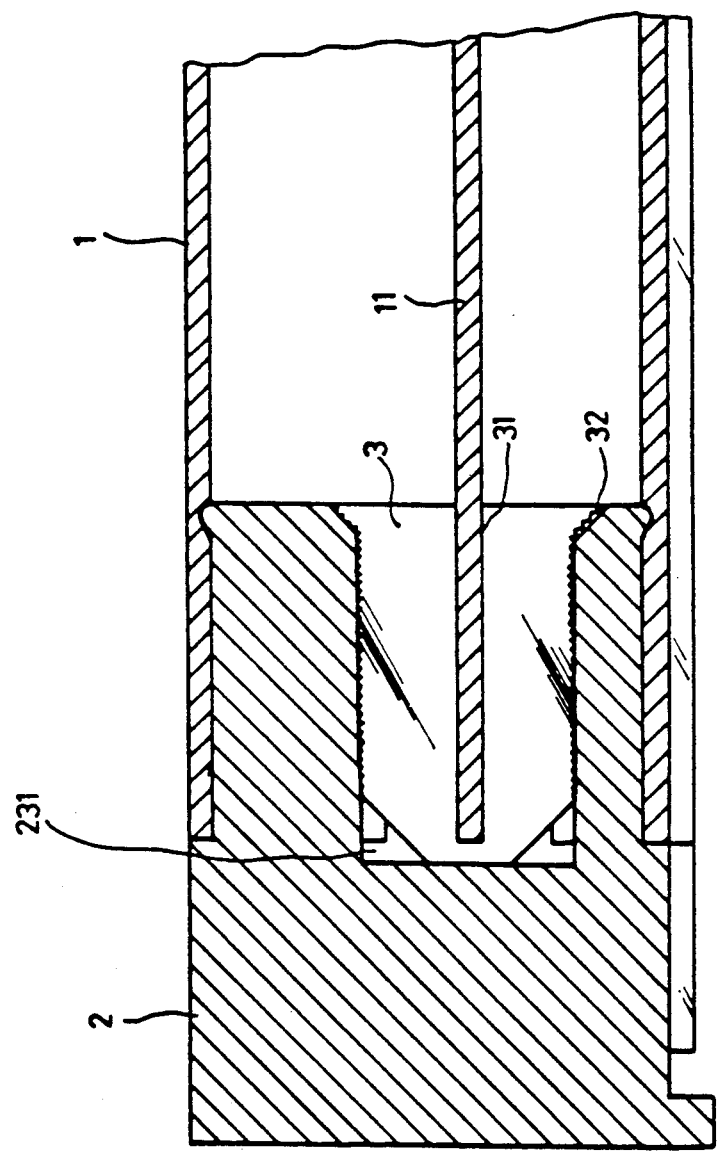
FIG. 2 is a cross-sectional view of the connecting joint of the case structure in accordance with the present invention.

As shown in FIG. 1, the connecting element 2 is substantially a right-angled structure provided with elongated insertion blocks 21, 22 and 23, the upper elongated block 21 having a generally triangular shaped cross-section. The upper and lower elongated blocks 21 and 22 are respectively inserted into the upper compartment 111 and the lower compartment 112 of plate 1. Also, two upper and two lower blocks 23 are respectively inserted into the upper and lower compartments 111 and 112 when plate 1 and element 2 are connected as shown in FIG. 2. Elongated blocks 23 are constructed in such a way that these blocks 23 are aligned to form a vertical slot 231 and a horizontal slot 232.

The insertion blocks 23 engage with the center hollow plate 1 at the compartments 111 and 112 and the horizontal slot 232 engages with the horizontal partition wall 11. The expansion block 3 is formed as a unit having a slot 31 as shown in FIG. 1 provided at the center thereof which engages wall 11 as shown in FIG. 2. The upper and lower edges of the expansion block 3 are provided with wave-like gripping portions, and the end portions of the edges are provided with tapered hook portions 32 which contact or engage blocks 21 and 22 as shown in FIG. 2. The thickness of the expansion block 3 is sized to exactly fit or engage the vertical slot 231 during assembly of block 3 with the connecting element 2. Such an engagement will provide rigid and secured fastening of the structure of the case.

While the invention has been described and illustrated in detail, it should be clearly understood that the above description is intended by way of illustration and example only and is not to be taken by way of limitation. The spirit and scope of this invention is limited only by the terms of the following claim.

I claim:

1. An improved structure of a connecting joint for a case comprising:

a hollow plate having a curved surface and being partitioned into an upper engaging slot, a lower engaging slot, and an upper compartment and a lower compartment formed by walls therein;

a right-angled connecting element having a plurality of elongated insertion blocks including an upper elongated block substantially triangular-shaped adapted to engage the upper compartment of the hollow plate, a lower elongated block adapted to engage the lower compartment of the hollow plate, the plurality of elongated blocks forming a vertical slot and a horizontal slot; and an expansion block substantially rectangular-shaped having a slot therein, the block having upper and lower edges with wave-like gripping portions and end portions of the edges provided with tapered hook portions, one end of the expansion block engaging the vertical slot formed by the plurality of elongated blocks, and one of the walls of the hollow plate engaging the slot in the expansion block at the opposite end of the expansion block in order to secure the hollow plate to the connecting element.

* * * * *